United States Patent [19]

Schaeffler

[11] 3,969,029

[45] July 13, 1976

[54] SHAFT COUPLING

[75] Inventor: Georg Schaeffler, Herzogenaurach, Germany

[73] Assignee: Industriewerk Schaeffler OHG, Herzogenaurach, Germany

[22] Filed: July 15, 1975

[21] Appl. No.: 596,071

[30] Foreign Application Priority Data

Aug. 16, 1974 Germany............................ 2439334

[52] U.S. Cl.................................... 403/26; 308/72; 403/343
[51] Int. Cl.² ......................................... F16D 1/00
[58] Field of Search ............... 403/26, 343; 19/294, 19/295; 64/5; 29/116 AD, 110; 308/187.1, 216, 194, 72

[56] References Cited
UNITED STATES PATENTS

| | | | |
|---|---|---|---|
| 2,592,718 | 4/1952 | McGhee | 19/294 |
| 2,659,637 | 11/1953 | Barr | 308/216 X |
| 3,766,792 | 10/1973 | Braun | 308/72 X |

FOREIGN PATENTS OR APPLICATIONS

| | | | |
|---|---|---|---|
| 1,266,154 | 5/1961 | France | 19/294 |
| 1,172,039 | 11/1969 | United Kingdom | 308/187.1 |

*Primary Examiner*—Andrew V. Kundrat
*Attorney, Agent, or Firm*—Hammond & Littell

[57] ABSTRACT

A novel shaft coupling particularly useful for bottom rollers in spinning machines wherein a shaft is provided at one end with an extension with a reduced diameter for engaging a longitudinal bore in the end of a second shaft, the connection of the two shafts in the area of the longitudinal bore being effected by a screw thread, a roller bearing arranged with its inner race on the shaft extension between the two shafts with the end surfaces of the two shafts bearing firmly on the end surfaces of the inner race.

2 Claims, 1 Drawing Figure

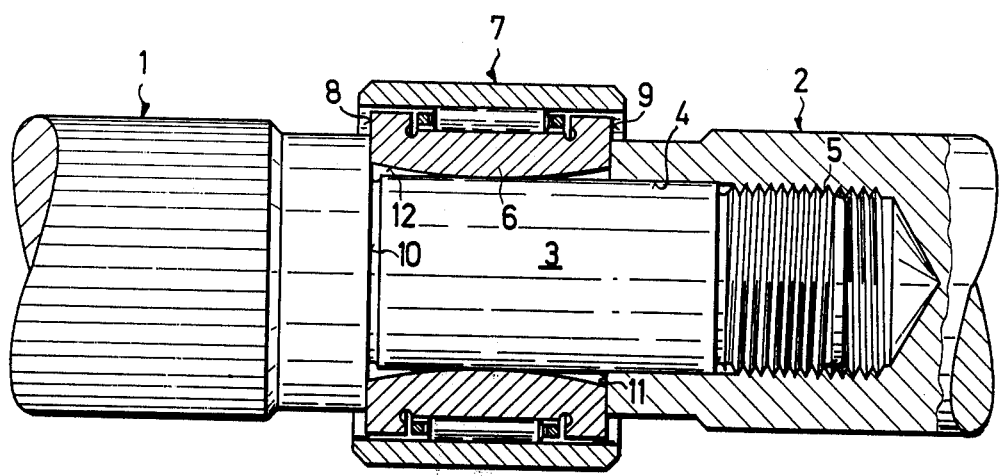

SHAFT COUPLING

STATE OF THE ART

Shaft couplings of this type are customary for bottom rollers on spinning machines whose overall length of about 20 m is made up of single shaft sections of about 60 cm length and a bearing is provided in the assembly of these sections at each coupling point. These coupling points are designed so that the two shafts bear firmly with their end surface or shoulders against the end surfaces of the inner race of the roller bearing when they are joined together by screwing. A slight and unavoidable lateral movement both at the end faces of the roller bearing and on the faces of the shaft ends cooperating with it can have in the most unfavorable case such an effect that the axes of the two shafts will not be exactly aligned when the shafts are joined together due to the firm bearing of the above mentioned end faces, but a slight break at the junction will show. This has the result that, after the shaft sections are screwed together, the entire shaft must be manually aligned to avoid wobbling of the shaft when revolving.

OBJECTS OF THE INVENTION

It is an object of the invention to provide a novel economical shaft coupling without the disadvantages of the prior art.

This and other objects and advantages of the invention will become obvious from the following detailed description.

THE INVENTION

The novel shaft coupling of the invention comprises a first shaft provided at its end with an extension of reduced diameter engaging a longitudinal bore in the end of a second shaft with the connection in the bore being effected by a screw thread, a roller bearing with its inner race arranged on the extension between the two shafts with the end surfaces of the two shafts bearing firmly on the end surfaces of the inner race of the bearing, the inner race having a bore with a slightly convex contour so that its longitudinal axis can slightly deviate from the longitudinal axis of the shaft when mounted.

This construction permits the inner race to align itself with the end surfaces of the two shafts when they are joined together regardless of whether the end surfaces of the inner race have any lateral movement relative to the bore and any lateral movement of the inner race will have no adverse effect on the shaft coupling. To obtain an exact shaft coupling, it is only necessary to ensure that the two end surfaces of the inner race are as exactly plane-parallel to each other as possible.

Referring now to the drawing:

The FIGURE is a cross-sectional view of one embodiment of the shaft coupling of the invention.

Shafts 1 and 2 are coupled to each other so that the extension 3 of shaft 1 engages a bore 4 of shaft 2 for the purpose of centering it, and is connected with the latter by means of screw thread 5. In the area of extension 3, there is arranged between the two shafts 1 and 2 the inner race 6 of a roller bearing 7, which is designed in the present case as a needle bearing. The inner race 6 bears on the mounted shaft coupling with its end surfaces 8 and 9 against the shoulder 10 of shaft 1 and the end surface 11 of shaft 2. The bore of inner race 6 has a convex contour 12 so that the inner race 6 can adjust itself slightly obliquely to the longitudinal axis of shafts 1 and 2. Any existing lateral movement on the inner race 6 can thus have no effect on the quality of the shaft coupling.

Various modifications of the shaft coupling of the invention may be made without departing from the spirit or scope thereof and it is to be understood that the invention is to be limited only as defined in the appended claims.

I claim:

1. A shaft coupling comprising a first shaft provided at its end with an extension of a reduced diameter engaging a longitudinal bore in the end of a second shaft with the connection in the bore being effected by a screw thread, a roller bearing with its inner race arranged on the extension between the two shafts with the end surfaces of the two shafts bearing firmly on the end surfaces of the inner race of the bearing, the inner race having a bore with a slightly convex contour so that its longitudinal axis can slightly deviate from the longitudinal axis of the shaft when mounted.

2. The shaft coupling of claim 1 wherein the end surfaces of the inner race are exactly plane-parallel.

* * * * *